3,336,944
QUICK CONNECT VALVED COUPLING
Dean M. Anderson, Lakewood, and Jay V. Calisher, Montebello, Calif., assignors to E. B. Wiggins, Inc., Los Angeles, Calif., a corporation of California
Filed Apr. 6, 1964, Ser. No. 357,531
2 Claims. (Cl. 137—614.04)

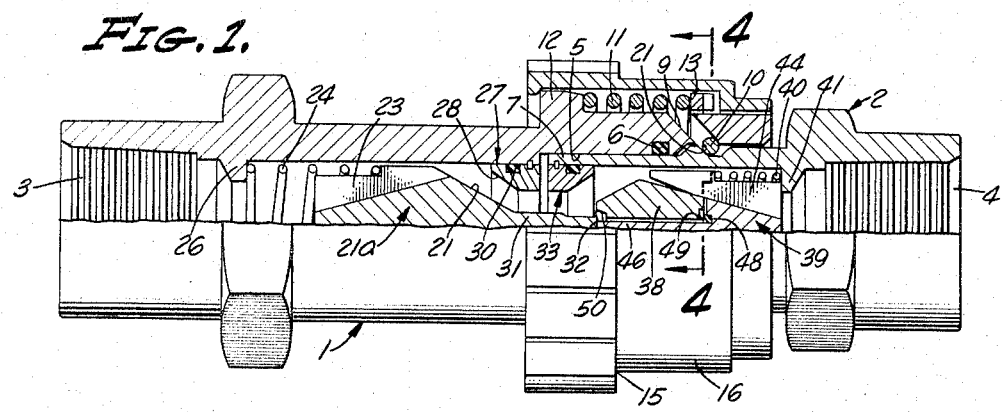
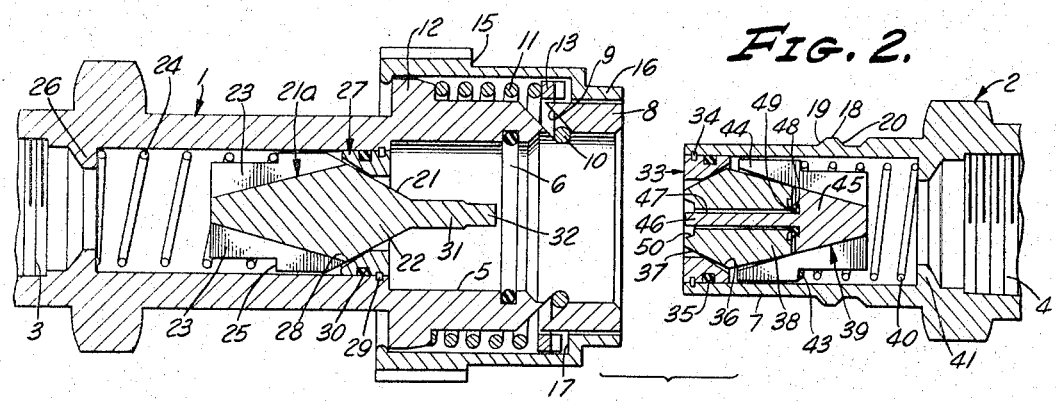
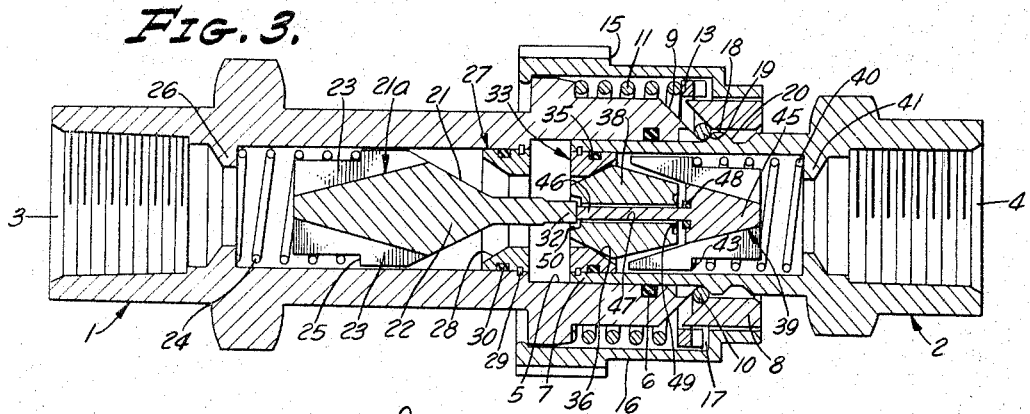
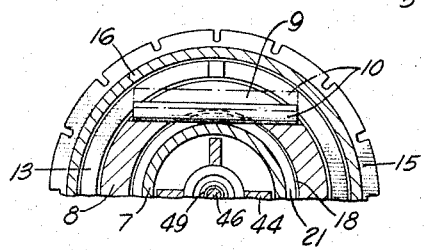
DEAN M. ANDERSON
JAY V. CALISHER
INVENTORS.
BY Paul A. Weiler
ATTORNEY

United States Patent Office 3,336,944
Patented Aug. 22, 1967

The present invention relates to quick connect valve couplings, and more particularly to a valved coupling which is especially suited for usage where a fluid line which is connected to one-half of the coupling is pressurized to such an extent as to render difficult the opening of the valve element therein due to the effect of high pressure within the conduit.

In the operation of auxiliary farm equipment which is tractor drawn and which comprises a hydraulic system for the operation of auxiliary apparatus by fluid pressure derived from a tractor mounted pump, valved couplings have been employed in the hydraulic system between the tractor and the auxiliary equipment, which coupling may be quickly disconnected and connected to allow mobility of the tractor while the auxiliary equipment remains at rest. Under such circumstances, it frequently occurs that the hydraulic pump on the tractor will not provide sufficient hydraulic pressure to reopen the valve in the coupling part carried by the auxiliary equipment if, as a result of a rise in temperature such as when such auxiliary equipment is at rest at a location in which it is exposed to the hot sun, pressure in the hydraulic system rises due to thermal expansion. Indeed, it is known to encounter locked-in fluid pressures in the auxiliary equipment system on the order of a number of thousandths of p.s.i., thus rendering difficult, if not impossible, the manual unseating of the coupling valve to allow the bleeding off of the high pressure.

Moreover, even were the manual bleeding of the high pressure possible in known valved couplings, the result would be loss of hydraulic fluid from the system.

An object of the present invention is to provide a valved coupling which automatically, upon connection of the coupling, will bleed off the high pressure in the hydraulic system of the auxiliary equipment.

Another object is to provide a valve coupling for accomplishing the above noted automatic bleeding of the high pressure from the hydraulic system of the auxiliary equipment wherein the fluid removed from such system flows into the coupling and is not lost from the composite working system of the tractor and the auxiliary equipment.

In accomplishing the above noted general objectives, the present invention contemplates the use of coupling parts respectively provided with valves for preventing flow through the coupling parts when they are disconnected and wherein one of such valves, namely the valve which is adapted for use on the auxilary equipment, or in such other location as may be desired or necessary, depending upon the use to which the invention is put, is provided with a compound valve comprising a bleeder valve having a very small area subjected to internal pressure so that the bleeder valve may be opened easily to bleed off high pressure, thus enabling opening of the main shut-off valve as by the pressure of fluid passing through the connected coupling.

Other objects and advantages of the invention will be hereinafter described or will become apparent to those skilled in the art, and the novel features thereof will be defined in the appended claims.

In the accompanying drawings:

FIG. 1 is a view partly in elevation and partly in section showing a valved coupling in assembled relation with the valve open to permit flow therethrough;

FIG. 2 is a longitudinal sectional view through the coupling parts, said parts being shown disassembled with the valve closed;

FIG. 3 is a longitudinal sectional view through the valved coupling showing the parts in positions during connection of the coupling parts, with the relief valve open; and FIG. 4 is a partial transverse sectional view as taken on the line 4—4 of FIG. 1.

Like reference characters in the several views of the drawings and in the following description designate corresponding parts.

The coupling components of the illustrative embodiment of the invention are conventional and, as seen in FIG. 1, comprise a female coupling part 1 and a male coupling part 2 respectively provided with connector ends 3 and 4 which are internally threaded or otherwise suitably adapted for connection to hydraulic lines, as for example in a hydraulic system of a farm tractor and auxiliary equipment such as a combine or the like which is to be towed by the tractor and operated in certain respects by the hydraulic fluid supplied by a tractor mounted pump.

At the opposite or free end of the female coupling part 1 from the connector end 3 it is formed with a bore 5 for the reception of the free end of the male coupling part 2, there being suitable means such as an O-ring 6 interposed between the inner extremity or nipple 7 of the male coupling part 2 and the tubular end 8 of the female coupling part 1 to effectively provide a seal.

As is seen in FIG. 4, the end 8 of coupling part 1 is provided with a suitable number of circumferentially spaced slots 9 disposed at an angle to the axis of the coupling part and extending inwardly slightly beyond the inside diameter of the end 8, in which slots are disposed a like number of latch pins 10. Means are provided for normally biasing the pins inwardly in the slots 9 and such means in the illustrative embodiment comprises a coiled spring 11 exteriorly surrounding the coupling end 8 and bearing at one end against an outwardly projecting radial flange 12 and bearing at the other end against an actuator washer 13 whereby a force is provided acting on the pins 10 to constantly urge the same toward the bottom of the slot 9.

Disposed about the coupling end 8 is an actuator sleeve 15 which constitutes means for moving the pins 10 outwardly in the slots 9. This sleeve 15 is slidable longitudinally on the flange 12 adjacent one end of the sleeve and at its other end the sleeve is provided with a centering and supporting neck 16 slidable on the outer periphery of the coupling end 8 and providing an internal shoulder 17 which, upon longitudinal movement of the sleeve 15 in the direction of the flange 12, will engage the extremities of the pins 10, as best seen in FIG. 4, whereby the latter will be caused to move outwardly due to the inclination of the slots 9.

The male coupling part 2 has means engageable by the pins 10 so as to retain the male coupling part in latched relation to the female part. Such means in the illustrative embodiment comprise an annular flange or rib 18 about the nipple portion 7 of the coupling part 2 which has on one face a ramped surface 19 engageable with the pins 10 to force them outwardly as the coupling nipple is inserted in the bore of end 8, the flange 18 having a ramped surface 20 engageable by the pins 10 whereby the nipple will be latched by the pins in the position shown in FIG. 1 after the flange 18 has passed through the pins and has cammed the latter outwardly and the spring 11 and actuator washer 13 have forced the pins inwardly into the locking position of FIG. 1.

As indicated above, the coupling as thus far described forms no part of the present invention, but is merely illustrative of a type of quick connect coupling which may be employed with valves for automatically opening the coupling to the flow of fluid upon assembly thereof and automatically shutting off the coupling upon disassembly thereof. Suffice it to say for the present description that the coupling includes first and second coupling parts one of which has a bore for slidably and sealingly receiving an extension or nipple of the other of the parts and the parts having cooperative means for releasably interlocking the same.

Referring now more particularly to FIG. 2 and to the female coupling part 1 thereof, it will be noted that there is provided a spring-loaded valve and seat therefor, the valve being denoted at 21a and having a conical seating surface 21 and a long tapered body 22 provided with a plurality of radial centering ribs 23 which in part closely fit within the passageway through the coupling part and which in part are of reduced radii so as to center a coiled spring 24 which abuts at one end with shoulders 25 on the ribs 23 and abuts at the other end with an internal flange 26 formed within the coupling part.

A valve seat is installed in the flow passage and is generally designated at 27, the valve seat having a conical seating surface 28 opposed to the seating surface 21 of the valve and being generally in the form of a ring secured in place within the flow passage by a resilient locking ring 29. Suitable sealing means is provided between the wall of the flow passage and the seat such as an O-ring seal 30 for preventing the leakage of fluid exteriorly of the seat.

Formed on the valve 21a and extending axially into the bore 5 is an elongated stem 31 having its free end 32 disposed inwardly of the O-ring 6 for a purpose which will hereinafter become apparent.

Referring to the male coupling half 2 as seen in FIG. 2, it will be noted that there is provided on the inner extremity of the extension or nipple 7 and within the flow passage therethrough a valve seat generally denoted at 33 which is retained in place by a resilient locking ring 34, there being an O-ring 35 or other suitable sealing means for preventing leakage around the outside of the seat.

This seat has a conical seating surface 36 for engagement by the conical seating surface 37 of a valve head 38, the valve head being normally biased toward the seat by means comprising a relief valve generally denoted at 39 and a coiled spring 40, the spring 40 at one end abutting with an internal flange 41 within the coupling part 2 and at its other end with shoulders 43 formed on a suitable number of circumferentially spaced centering ribs 43 carried by the relief valve and having outwardly flared extremities 44 extending into overlapping relation to the valve head 38.

Relief valve 39 includes a head 45 and an elongate stem 46, the latter extending axially through a bleed opening 47 in the valve head 38. At the juncture of the relief valve head 45 and its stem 46, a resilient seal element 48 is provided for contact by an annular shoulder 49 on the head 38.

The relief valve stem 46 at its outer extremity provides means coengageable with the end face 32 of the elongated stem 31 of the valve 21a contained in the coupling part 1 upon connection of the coupling. In order to enable a sufficient amount of relative axial movement between the relief valve 39 and the valve head 38 so that the relief valve may be unseated, the valve head 38 is provided with an axially extended annular groove 50 in which the end of valve stem 46 is disposed, whereby the relief valve head 45 may move a distance sufficient to permit the bleeding of fluid through the passage 47, as seen in FIG. 3, when the stem 31 contacts the stem 46. In this connection, it will be noted that the groove 50 is larger in diameter than the end 32 of stem 31. The effect of this specific structure is the provision of a relief valve stem of an effective length greater than the length of valve head 38 by an amount which is equal to the maximum relative axial movement of the compound valve elements 38 and 39, whereby the relief valve may be unseated.

It will be appreciated that with the relief valve 39 as shown in FIG. 2 closed against the valve head 38 and with the valve head 38 seated against the seating surface 36, fluid pressure is trapped within the coupling part 2 and there is a force tending to hold the composite valve assembly closed. This force is a factor of hydraulic pressure times the exposed area of the valve head 38 and the relief valve 39, plus the force of spring 40. Accordingly, in the event that substantial fluid pressure is trapped within the coupling part 2 the relief valve 39 may be opened by merely overcoming the effect of such trapped pressure upon an area approximately equal to the cross sectional area of the stem 46 plus the spring force, this being a very small area in relation to the gross area of the compound valve.

It will now be understood that in the use of the coupling of the present invention, as the coupling parts are being connected as shown in FIG. 3, the inner extremity or nipple 7 of the coupling part 2 will engage within the sealing O-ring 6 of the coupling part 1, and thereafter, responsive to further axial movement of the coupling parts towards one another, the stem 31 of valve 21a will contact the stem 46 of relief valve 39, resulting in compression of the spring 24 which acts upon valve 21a up to the point that the resistance offered by the spring 24 overcomes the hydraulic force and the spring force acting on the relief valve 39. Thereupon, the hydraulic pressure will be bled from coupling part 2 into the flow passage of coupling part 1 and such fluid will not be lost.

Once the relief valve has been unseated and the coupling fully connected as shown in FIG. 1, the valve head 38 and the relief valve 39 together will be biased away from the seat 33 in the coupling part 2 by the force of spring 24. The valve head 38 and relief valve 39 will be moved to a fully unseated position as shown in FIG. 1, only after the nipple 7 is within the seal ring 6 and the flow of fluid from coupling part 1 into coupling part 2 opens the valve 38.

By virtue of the above described construction, there is provided a valve coupling which not only affords adequate flow area when the valves are open so that there is no substantial resistance to flow, but also the invention provides a valved coupling which may be easily connected notwithstanding the possibility that there may be trapped in the coupling part 2 hydraulic fluid at a pressure in excess of the available pressure from a source of fluid which will supply fluid under pressure to the coupling part 1. Thus, the problems referred to at the commencement hereof with respect to valved couplings of the type here involved, have been overcome with the novel valve structure of the present invention.

While specific structural details have been shown and described, it should be understood that changes and alterations may be resorted to without departing from the spirit of the invention as defined in the appended claims.

We claim:

1. A valved coupling, comprising: a female coupling part and a male coupling part; said female coupling part having a flow passage therethrough; normally closed valve means in said flow passage; said female part also having a bore at one end of said flow passage; said valve means including a valve seat circumscribing said flow passage; a valve member shiftable in said flow passage into and out of engagement with said seat; a spring in said flow passage normally biasing said valve into engagement with said seat; said valve having a projection extending through said seat; said male coupling part having an end adapted to be moved into said bore; said coupling parts respectively having sealing means and releasable means for holding said coupling parts together upon insertion of said end into said bore; said male coupling part having a flow passage extending through said end thereof; compound valve means in said flow passage including a main valve seat circumscribing said flow passage; a main valve movable into and out of engagement with said seat; means supporting said main valve in said flow passage including a relief valve; said main valve having an opening therethrough; said relief valve having a stem extending through said opening and adapted for engagement by said projection upon connection of said coupling parts; said main valve and said relief valve including coacting seating surface means for closing said opening through said main valve; and a spring engaged with said relief valve to bias said relief valve means to closed position and for biasing said main valve into engagement with its seat; said projection and said stem constituting abutment means for unseating said relief valve means upon coupling of said parts together.

2. A valved coupling assembly as defined in claim 1, wherein said male coupling part includes abutment means in said flow passage; said spring for biasing said relief and main valves closed engaging said abutment means; said relief valve means having parts disposed for engagement with said abutment means to limit movement of said relief valve means against said spring and to cause said valve in said female coupling part to be opened against its spring responsive to engagement of said stem and said projection and engagement of said parts of said relief valve with said abutment means.

References Cited
UNITED STATES PATENTS

| | | | |
|---|---|---|---|
| 2,896,977 | 7/1959 | Hansen | 137—614.04 X |
| 2,905,485 | 9/1959 | Zajac | 251—149.6 |
| 3,032,063 | 5/1962 | Wells | 137—630.15 X |
| 3,132,667 | 5/1964 | Baker | 137—614.05 X |
| 3,155,370 | 11/1964 | Drumm | 137—614.06 X |

WILLIAM F. O'DEA, *Primary Examiner.*

H. W. WEAKLEY, *Examiner.*